United States Patent
Baumann et al.

(10) Patent No.: US 9,141,342 B2
(45) Date of Patent: Sep. 22, 2015

(54) PROGRAMMATIC CONVERSION OF SUPPORT DOCUMENTATION INTO EXECUTABLE PROGRAMS

(75) Inventors: Warren J. Baumann, Monroe, NY (US); Firas Bouz, Lexington, KY (US); Wesley Stevens, Nicholasville, KY (US); Glen S. Waller, Callala Bay (AU)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 12/956,049

(22) Filed: Nov. 30, 2010

(65) Prior Publication Data

US 2012/0137212 A1    May 31, 2012

(51) Int. Cl.
G06F 17/00 (2006.01)
G06F 9/44 (2006.01)
G06F 17/21 (2006.01)
G06F 17/27 (2006.01)

(52) U.S. Cl.
CPC . G06F 8/30 (2013.01); *G06F 17/21* (2013.01); *G06F 17/27* (2013.01)

(58) Field of Classification Search
CPC ............ G06F 8/30; G06F 17/21; G06F 17/27
USPC .......................................... 715/239; 717/123
See application file for complete search history.

(56) References Cited

U.S. PATENT DOCUMENTS

| | | | |
|---|---|---|---|
| 5,524,201 A * | 6/1996 | Shwarts et al. ............... | 715/763 |
| 6,477,531 B1 | 11/2002 | Sullivan et al. | |
| 6,542,898 B1 | 4/2003 | Sullivan et al. | |
| 6,615,240 B1 | 9/2003 | Sullivan et al. | |
| 6,694,314 B1 | 2/2004 | Sullivan et al. | |
| 7,734,699 B2 * | 6/2010 | Bhatnagar ..................... | 709/206 |
| 2002/0161600 A1 | 10/2002 | Stubiger et al. | |
| 2003/0221169 A1* | 11/2003 | Swett ............................ | 715/514 |
| 2004/0153712 A1 | 8/2004 | Owhadi et al. | |
| 2005/0028144 A1* | 2/2005 | Bergman et al. .............. | 717/128 |
| 2005/0183089 A1* | 8/2005 | Negishi et al. ................ | 719/310 |
| 2007/0169003 A1* | 7/2007 | Branda et al. ................. | 717/130 |
| 2008/0172574 A1 | 7/2008 | Fisher | |
| 2008/0189690 A1* | 8/2008 | Heifets et al. ................. | 717/147 |
| 2009/0083092 A1* | 3/2009 | Valentin et al. .................... | 705/7 |
| 2010/0005339 A1 | 1/2010 | Hooks | |

FOREIGN PATENT DOCUMENTS

EP          1203661 A2 *   5/2002   ............. B41F 13/00

* cited by examiner

*Primary Examiner* — Scott Baderman
*Assistant Examiner* — Howard Cortes
(74) *Attorney, Agent, or Firm* — William E. Schiesser; Keohane & D'Alessandro PLLC; Maxine L. Barasch

(57) ABSTRACT

Embodiments of the present invention provide an approach to automatically convert existing support materials (support manuals, troubleshooting guides, content, help files, etc.) into machine-executable programs so as to obviate for manual execution of the steps described in the support materials. That is, the embodiments of the invention will (among other things): create support-based programs that automate the execution of previously manual steps; create an inventory of said programs; parse existing support documentation; map sections of each support document into existing program automation; construct a sequence of program automations that resemble the flow of each support document; and/or associate a constructed sequence of automation with a support document that could be executed automatically.

22 Claims, 6 Drawing Sheets

PROGRAMMATIC CONVERSION OF SUPPORT DOCUMENTATION INTO EXECUTABLE PROGRAMS

TECHNICAL FIELD

The present invention relates generally to programmatic-based support. Specifically, the present invention relates to the automatic creation of support-based programs from technical support content.

BACKGROUND

The process of providing technical assistance to end users is laborious, complex, error prone, and consequently costly. Today, technical solutions and computing principles exist to remedy known technical problems or intercept their occurrence. However, artificially intelligent systems, as well as autonomic computing principles, continue to possess shortfalls in terms of applicability to real-life challenges. As a result, technical assistance continues to be in high demand for large organizations and private individuals alike.

Traditionally, support communities operate from a knowledge base that includes past reported as well as potential future problems and their solutions. Knowledge bases are utilized to ensure that proper expertise is captured, refined, and shared among support professionals and end users alike. Regardless of whether the support knowledge base (e.g., support or help documentation) is utilized by an experienced professional or a novice use, the process involves understanding the support documentation available and then manually executing the remediation steps outlined therein.

SUMMARY

In general, embodiments of the present invention provide an approach to automatically convert existing support materials (support manuals, troubleshooting guides, content, help files, etc.) into machine-executable programs so as to obviate for manual execution of the steps described in the support materials. That is, the embodiments of the invention will (among other things): create support-based programs that automate the execution of previously manual steps; create an inventory of said programs; parse existing support documentation; map sections of each support document into existing program automation; construct a sequence of program automations that resemble the flow of each support document; and/or associate a constructed sequence of automation with a support document that could be executed automatically.

A first aspect of the present invention provides a computer-implemented method for converting support documents into programs, comprising: parsing a set of support documents for a system; identifying a set of actions based on the parsing; generating a set of support programs capable of automating the set of actions; and storing the set of support programs in a database that comprises in an inventory of support programs.

A second aspect of the present invention provides a system for converting support documents into programs, comprising: a bus; a processor coupled to the bus; and a memory medium coupled to the bus, the memory medium comprising instructions to: parse a set of support documents for a system; identify a set of actions based on the parsing of the set of documents; generate a set of support programs capable of automating the set of actions; and store the set of support programs in a database that comprises in an inventory of support programs.

A third aspect of the present invention provides a computer program product for converting support documents into programs, the computer program product comprising a computer readable storage media, and program instructions stored on the computer readable storage media, to: parse a set of support documents for a system; identify a set of actions based on the parsing of the set of documents; generate a set of support programs capable of automating the set of actions; and store the set of support programs in a database that comprises in an inventory of support programs.

A fourth aspect of the present invention provides a method for deploying a system for converting support documents into programs, comprising: deploying a computer infrastructure being operable to: parse a set of support documents for a system; identify a set of actions based on the parsing of the set of documents; generate a set of support programs capable of automating the set of actions; and store the set of support programs in a database that comprises in an inventory of support programs.

BRIEF DESCRIPTION OF THE DRAWINGS

These and other features of this invention will be more readily understood from the following detailed description of the various aspects of the invention taken in conjunction with the accompanying drawings in which.

Figure 1:
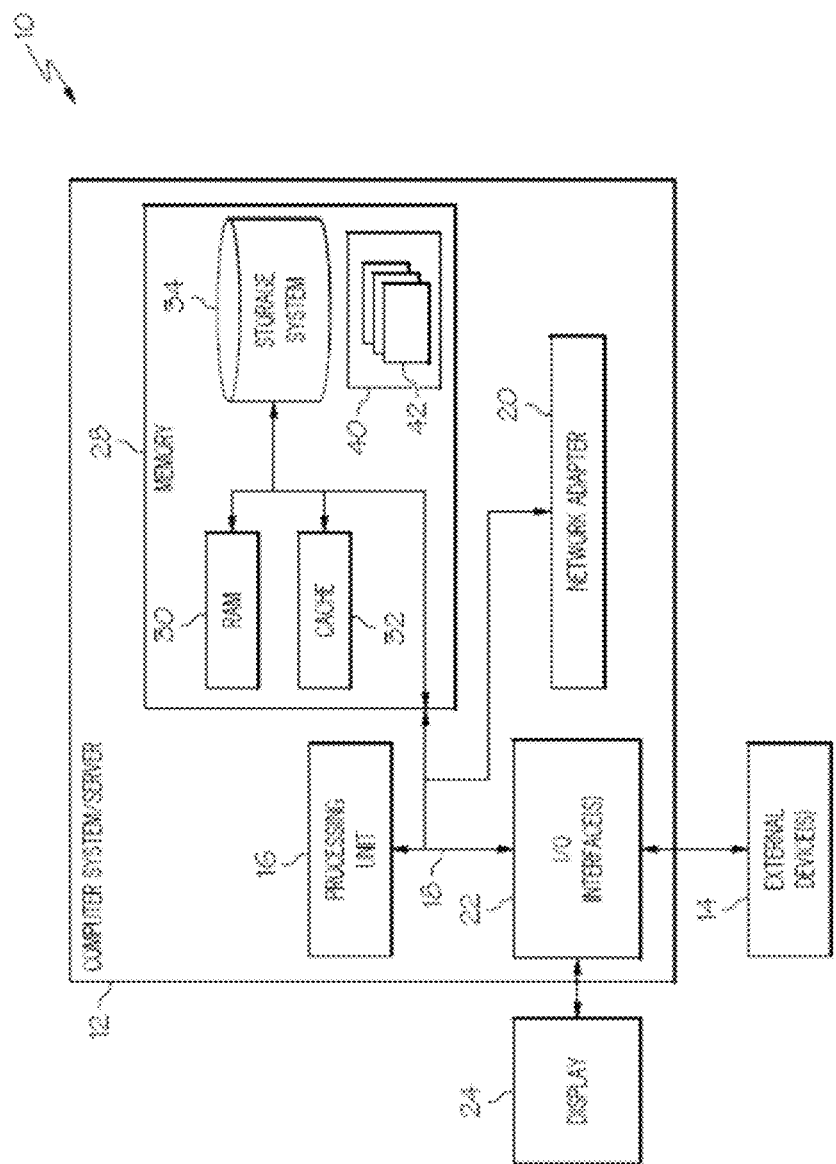
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As will be further described below, embodiments of this invention leverage the development of an initial set of technical operations for a particular platform or application. However, once developed, these concepts could be applied to existing support documentation to translate that into a list of programs that could be run to execute the technical steps outlined in said documentation. Having this ability will significantly reduce the overhead of any support organization.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Support automation program/utility 40, having a set (at least one) of program modules 42, may be stored in memory 28 by way of example, and not limitation, as well as an operating system, one or more application programs, other program modules, and program data. In general, support automation program 40 can perform the function of the present invention as described herein. For example, modules 42 of support automation program 40 will parse support documentation, identify sets of actions, create programs capable of automating the sets of action, inventory created support programs, etc. Along these lines, modules 42 can comprise a parser or the like, a program generator, etc. Regardless, each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is understood that this invention can be practiced in any type of computing environment, an example of which is a cloud computing environment.

As indicated above, embodiments of the invention are based on the concept of automating a list of all possible support actions/operations for a particular platform or an application that is being supported, and then mapping the list of technical steps in a support document (written in a natural language) to a list of automated operations. The developed list can then be executed in the same order as the steps in the document in question to achieve the same results but without manual performing the technical steps. As also indicated above, In general, embodiments of the present invention provide an approach to automatically convert existing support materials (support manuals, troubleshooting guides, content, help files, etc.) into machine-executable programs so as to obviate for manual execution of the steps described in the support materials. That is, the embodiments of the invention will (among other things): create support-based programs that automate the execution of previously manual steps; create an inventory of said programs; parse existing support documentation; map sections of each support document into existing program automation; construct a sequence of program automations that resemble the flow of each support document; and/or associate a constructed sequence of automation with a support document that could be executed automatically.

As used herein, the word "system" in this context refers to any software product for which support may be needed, such as an operating system or a software application on a particular operating system. The list of possible actions that could be executed on such a system can be extremely large, but finite nonetheless. Actions are defined to be a single atomic operation, such as opening a control panel or device manager on a Windows® operating system (Windows® and related terms are trademarks of Microsoft Corporation in the United States and/or other countries), changing access control list (ACL) values or looking up an Internet Protocol (IP) address on a Linux OS, etc. A short program will be generated/created to automate each action and will be assigned a unique identification code as well as a unique human readable keyword. Once all actions have been automated, the actions will be stored in a database or the like that supports lookup operations by keywords. Each support document is then parsed/analyzed (e.g., by a parser) for the occurrence of keywords in each of their technical steps, and the corresponding action from the automation database will be queried and queued to construct a program that comprises a sequence of action(s) that resemble the same manual technical steps that are outlined in the document in question.

This approach assumes that support material is constructed in such a way that breaks its problem resolution content into a sequence of steps, and that each step uses system keywords that are based on the same dictionary as those that were used to label all automated actions. Since the parser may not have the "intelligence" to understand the natural language in which the support content was written, the content can be re-structured in a specific way. For example, the parser will need to know where in the support document the actual support content begins (bypassing introductory or background content), find out the 'steps' outlining the action to be taken, and then within each step identifying keywords which could be mapped to an entry in its automation library. This means that the parser will need the definition of a predefined, formal language describing the layout of the support document, and the allowed set of keywords to be used, which is mapped to the automation library. The syntax of the language which guides the parser to the section of interest could be implemented as a markup language which tells the parser at conversion time where to look for things (sections) and what things to look for (keywords).

For newly created support documents, authors could be presented with a "what you see is what you get" (WYSIWYG) editor which guides them on what to provide for each section of the document, including the option to select a keyword (an action on the system) from a drop down menu, etc. Existing documents will first be converted to the new markup language understood by the parser. The parser will attempt to do so automatically by identifying sections and keywords in the document, and then will present the new layout of the document to the user in the form of a proposal that indicates what elements of the document should be mapped to which markup it expects (e.g., "here's what I think your introduction section is", "here's where I think the actions section begins", "the highlighted text represents the actions we'll need to automate", etc.).

The parser will then provide the author with the ability to change the details of its proposal, and to supply details for the things it failed to include in the proposal. For example, authors will have the option to highlight a specific paragraph and mark it as action-irrelevant (introduction, background, links to more details, etc.). The author can select any word in the document and choose a keyword from a drop down list of options to replace it with, to allow the parser to map it to an existing automation, etc.

The resulting document, which is now written in the new markup language, can then be passed through an automation mapper to build a concatenation of programs that represent the original support document.

The text below outlines an example of how this process could use an existing system such as AutoMate® (AutoMate® is a trademark of Network Automation, Inc in the United States and/or other countries) to execute a list of commands from a help document. AutoMate® is an existing framework for building automation of tasks from simple to complex. It allows for clicking, typing, and navigating, which can be put together in complex structures to perform almost any given task. This system will parse the content of the help document, using keywords to determine sections and commands. These commands can then be passed to the AutoMate® portion of the system in order to execute, thereby automating the execution of the help document. For example, if the following help file is used:

Symptom: Sometimes the network client cannot be correctly configured if "large fonts" is chosen as the default font.

Resolution: If the system is configured to use large fonts, then the network client's non-resizable/non-scrollable setup windows are not displayed correctly and cannot be used to configure the client.

For example, with 125% size fonts, it is not possible to select "Managed virtual private network (VPN)—IPSec DualAccess" because the drop-down list is off the bottom of the window.

The resolution is to change the font display:
1. Click Start and select Control Panel.
2. Double click on Display.
3. Click Appearance.
4. From the Font Size drop-down, select Normal.
5. Restart the AT&T Network Client.

The process will first parse the help document looking for sections. Once the appropriate section is found, it will begin walking through the steps laid out in the document that need to be executed. Using the example above, once the parser finds the first step (step 1), it will use keywords from that step in order to execute. In this example, the keyword "click" followed by the item to click will be passed to the automation portion of the system to execute. The system's parser will have the ability to combine statements as well, such as in step 1 where "and" is used, allowing the system to perform both commands from this single step. Additionally, the parsing system will be able to determine the usage of additional words and phrases between keywords and commands. An example of this can be seen in step 2, where the word "on" has been placed between the key word and the command to execute.

Illustrative Example

Figure 2:
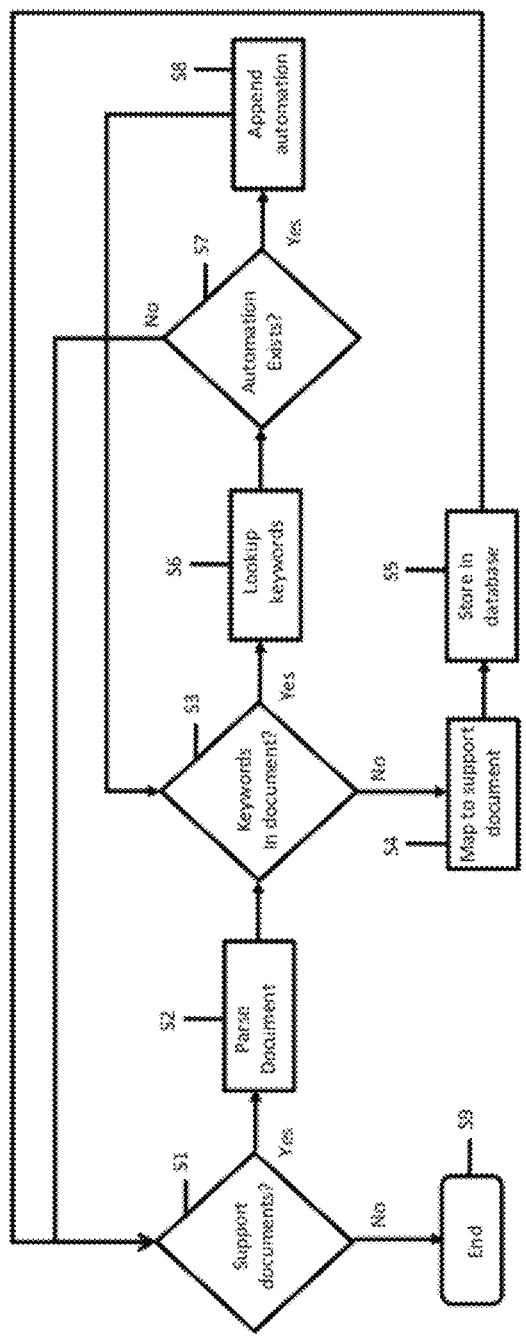
FIG. 2 depicts a process flow diagram according to an embodiment of the present invention.
Figure 3:
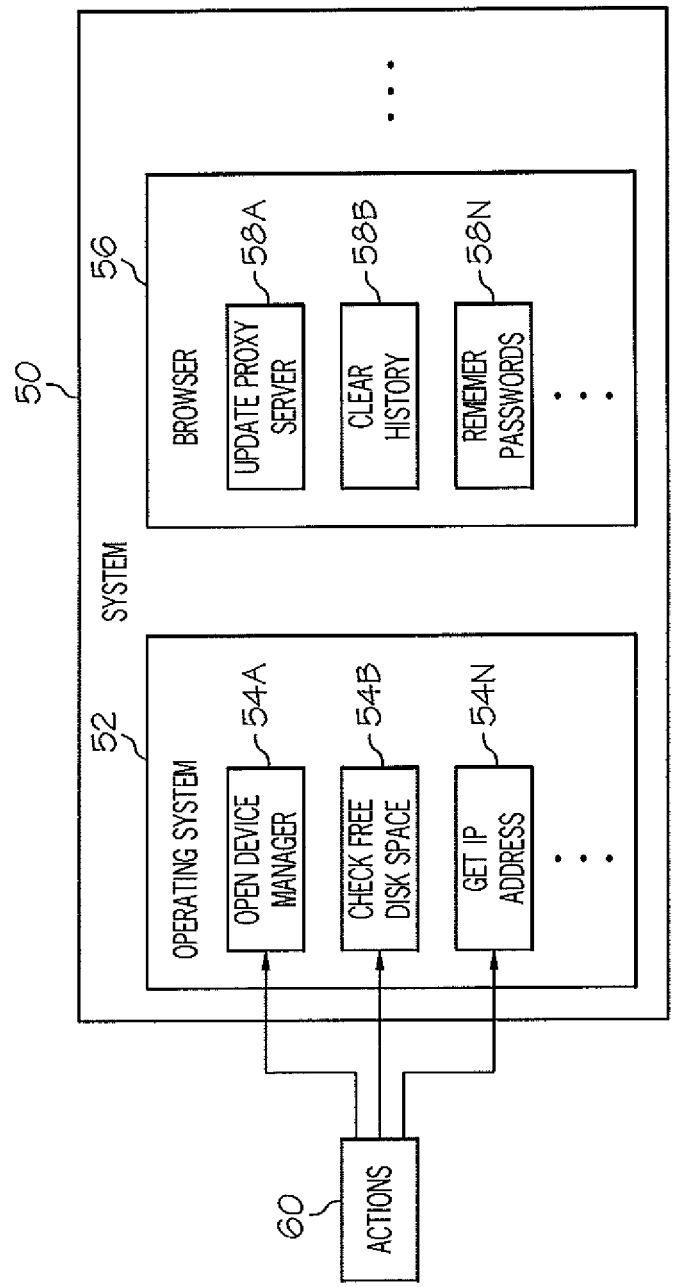
FIG. 3 depicts the relationship between system and actions according to an embodiment of the present invention.
Figure 4:
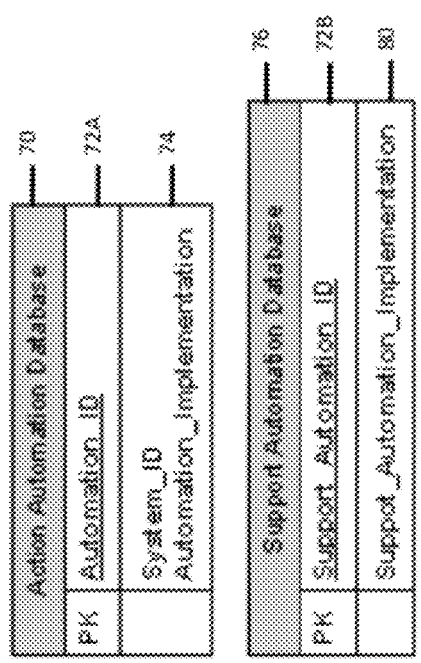
FIG. 4 depicts illustrative database schemas according to an embodiment of the present invention.

Referring now to FIGS. 2-4, these concepts will be described in greater detail in conjunction with an illustrative example. Referring first to FIG. 2, a process flow diagram is shown in greater detail. It is understood that the process flow diagram in FIG. 2 is depicted from a point of view of a requester seeking technical support for a system. Along these lines, FIG. 2 depicts the obtaining of support using programs generated form support documents, as opposed to the creation of the programs that will be described in conjunction with FIG. 6. It is further understood that these steps can be performed by modules 42 of support automation program/utility 40. Along these lines, a component referred to as a "parser" can represent one or more of the modules 42. It is understood that the term "parser" is used only as one possible example of a manner in which the embodiments of the invention can be implemented. Regardless, in step S1, it will be determined whether support documents (e.g., technical support documents) exist for a system in which support is needed. Assuming a set (e.g., at least one) of support documents do exist, the parser will parse the set of support documents in step S2. From the parsing operation, it will be determined whether keywords representing a set of actions can be identified in the set of support documents. If not, any accumulated automation to this point in the process is mapped to the set of support documents in step S4, and then stored in a database in step S5. If keywords did exist in step S3, they will be cross-referenced in the database to determine corresponding actions in step S6. Based on this lookup operation, it will be determined whether corresponding program automation exists in step S7. Specifically, using the keywords, it will be determined whether any programs were previously created that can address the issue with the system. If so, the automation is appended in step S8. That is, the corresponding program(s) will be identified and made accessible to the requester of the support. If, however, automation did not exist (e.g., program(s) were not identified), additional support documents will be identified that may help identify such automation. Once there are no more support documents, the process will end in step S9.

It is understood that the database(s) cross-referenced typically contain(s) entries that associate keywords with actions, as well as actions and/or keywords with programs. This will typically be accomplished by assigning each keyword, action, and/or program with a unique identification code.

It is noted that FIG. 2 does not capture the concept of using the user's assistance to identify "sections" and keywords in the document. In contrast, FIG. 2 ends the processing of a document if a section is not found in the document, or if a keyword's lookup from the automation inventory was not successful.

Referring now to FIG. 3, a visual representation of how systems and actions relate to each other is shown. As depicted, within system 50 there is shown an operating system 52 and a browser 56. Actions 60 can result in any number of operations such as opening a device manager 54A, checking free disk space 54B, and/or getting an Internet Protocol (IP) address 54N with respect to operating system 52. Similarly, with respect to browser 56, actions 60 can result in updating a proxy server 58A, clearing browsing history 58B, and/or remembering passwords 58N. Each action can be associated with a keyword as well as a program capable of carrying one or more actions out.

Referring now to FIG. 4, illustrative schemas for a database table 76 that stores the automation programs, as well as a mapping between an entry in the automation table and a unique identification code representing the automation in support documentation (e.g., an action automation database table 70) are shown. It is understood that more than one identification code (keyword in a support document) can be mapped to a single automation program (N–1 relationship). Specifically, database table 76 associates identification code 72B with a program 80 used to automate support (e.g., program 80 implements one or more actions. Database table 70 associates the unique identification code 72A with support documentation 74. Tables 70 and 76 thus provide links between identification codes, support documents, and programs/actions.

Figure 5:
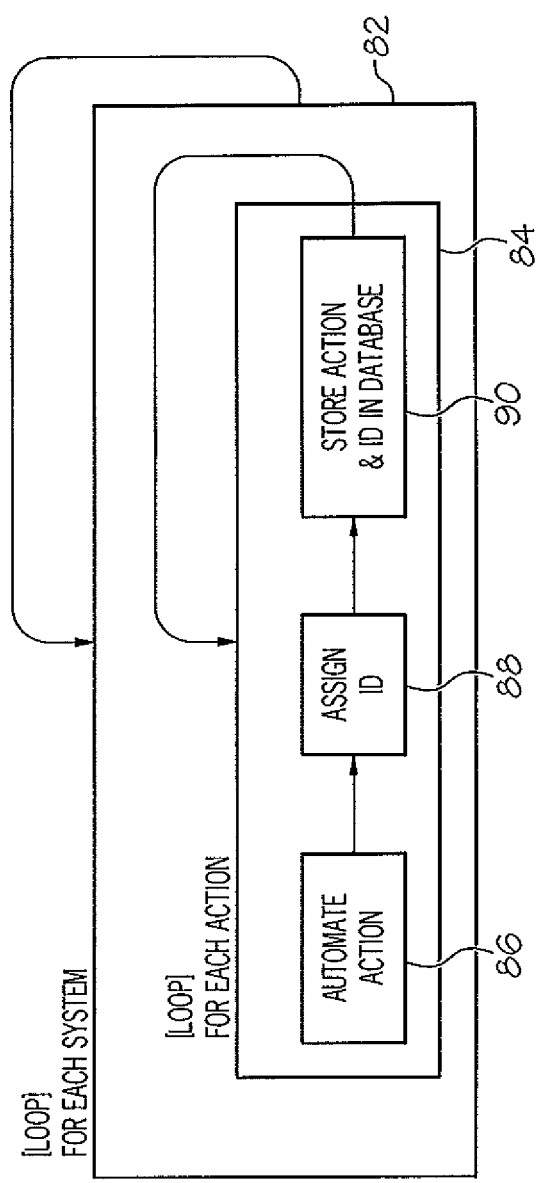
FIG. 5 depicts a process flow diagram according to an embodiment of the present invention.

FIG. 5 shows the storage process of the items shown in FIG. 4. As depicted, multiple loops can be provided for the system 82 and each action 84. As depicted, an automated action 86 is assigned an identification code 88, and stored in a database 90.

Figure 6:
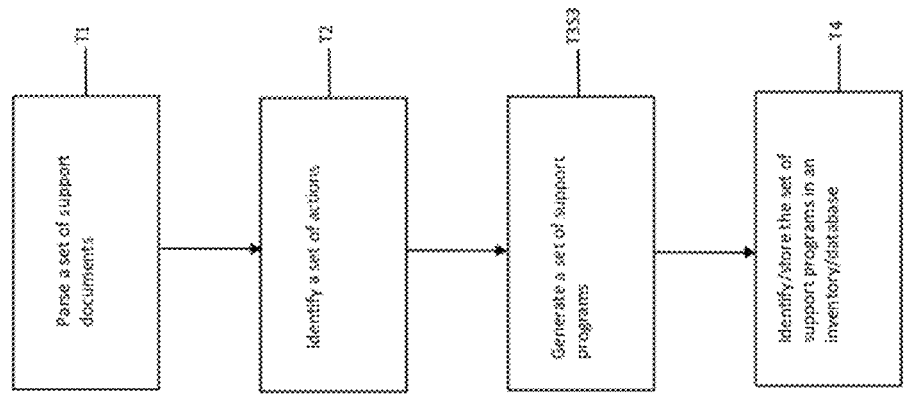
FIG. 6 depicts a method flow diagram according to the present invention.

Referring now to FIG. 6, a method flow diagram according to the present invention is shown. As depicted, a set of support documents is parsed for a system is step T1. A set of actions is identified based on the parsing in step T2. In step T3, a set of support programs capable of automating the set of actions is generated. In step T4, the set of support programs is identified in an inventory/database of support programs. The inventory typically associates support programs with corresponding identification codes. Moreover, the set of programs can resemble a flow of the set of actions within the set of support documents. Although not shown, the set of support documents can first be converted into a predefined language prior to the parsing. Moreover, mapping sections of the set of support documents can be mapped hereunder to the set of programs.

While shown and described herein as a programmatic support solution, it is understood that the invention further provides various alternative embodiments. For example, in one embodiment, the invention provides a computer-readable/useable medium that includes computer program code to enable a computer infrastructure to provide programmatic support for application migration functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide a programmatic support solution for application migration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for programmatic support. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for converting support documents into programs, comprising:
   locating a set of technical steps written in natural language form in a set of support documents for a system;
   parsing, for keywords in the technical steps, in the set of support documents;
   responsive to the parsing, identifying a set of actions based on the keywords;
   determining whether any pre-existing programs are available in a database for executing any of the identified set of actions;
   generating a set of programs to automate each action of the set of identified actions for which it is determined that no pre-exiting programs are available;
   mapping a set of pre-existing and generated programs to each action of the set of identified actions;
   creating a set of support programs comprising the mapping of the generated set of programs and the any pre-existing programs; and
   storing the set of support programs in the database, wherein the database comprises an inventory of support programs.

2. The method of claim 1, further comprising converting the set of support documents into a predefined language prior to the parsing.

3. The method of claim 1, the inventory associating support programs with corresponding identification codes.

4. The method of claim 1, the set of support programs being a computer-executable set of support programs.

5. The method of claim 1, the support documents relating to addressing an issue with a system, the system being selected from a group consisting of computer hardware, computer software, or a combination of computer hardware and computer software.

6. The method of claim 1, the set of programs implementing a flow of the set of actions within the set of support documents.

7. The method of claim 1, further comprising mapping sections of the set of support documents to the set of programs.

8. A system for converting support documents into programs, comprising:
   a bus;
   a processor coupled to the bus; and
   a memory medium coupled to the bus, the memory medium comprising instructions to:
   locate a set of technical steps written in natural language form in a set of support documents for a system;
   parse, for keywords in the technical steps, in the set of support documents;
   responsive to the parsing, identifying a set of actions based on the keywords;
   determine whether any pre-existing programs are available in a database for executing any of the identified set of actions;
   generate a set of programs to automate each action of the set of identified actions for which it is determined that no pre-exiting programs are available;
   map a set of pre-existing and generated programs to each action of the set of identified actions;

create a set of support programs comprising the mapping of the generated set of programs and the any pre-existing programs; and store the set of support programs in the database, wherein the database comprises an inventory of support programs.

9. The system of claim 8, the memory medium further comprising instructions to convert the set of support documents into a predefined language prior to the parsing.

10. The system of claim 8, the inventory associating support programs with corresponding identification codes.

11. The system of claim 8, the set of support programs being a computer-executable set of support programs.

12. The system of claim 8, the system being selected from a group consisting of computer hardware, computer software, or a combination of computer hardware and computer software.

13. The system of claim 8, the set of programs implementing a flow of the set of actions within the set of support documents.

14. The system of claim 8, the memory medium further comprising instructions to map sections of the set of support documents to the set of programs.

15. A computer program product for converting support documents into programs, the computer program product comprising a computer readable storage media, and program instructions stored on the computer readable storage media, to:

locate a set of technical steps written in natural language form in a set of support documents for a system;

parse, for keywords in the technical steps, in the set of support documents;

responsive to the parsing, identifying a set of actions based on the keywords;

determine whether any pre-existing programs are available in a database for executing any of the identified set of actions;

generate a set of programs to automate each action of the set of identified actions for which it is determined that no pre-exiting programs are available;

map a set of pre-existing and generated programs to each action of the set of identified actions;

create a set of support programs comprising the mapping of the generated set of programs and the any pre-existing programs; and store the set of support programs in the database, wherein the database comprises an inventory of support programs.

16. The computer program product of claim 15, the memory medium further comprising instructions to convert the set of support documents into a predefined language prior to the parsing.

17. The computer program product of claim 15, the inventory associating support programs with corresponding identification codes.

18. The computer program product of claim 15, the set of support programs being a computer-executable set of support programs.

19. The computer program product of claim 15, the set of support documents addressing an issue of a system, the system being selected from a group consisting of computer hardware, computer software, or a combination of computer hardware and computer software.

20. The computer program product of claim 15, the set of programs implementing a flow of the set of actions within the set of support documents.

21. The computer program product of claim 15, the memory medium further comprising instructions to map sections of the set of support documents to the set of programs.

22. A method for deploying a system for converting support documents into programs, comprising:

deploying a computer infrastructure being operable to:

locate a set of technical steps written in natural language form in a set of support documents for a system;

parse, for keywords in the technical steps, in the set of support documents;

responsive to the parsing, identifying a set of actions based on the keywords;

determine whether any pre-existing programs are available in a database for executing any of the identified set of actions;

generate a set of programs to automate each action of the set of identified actions for which it is determined that no pre-exiting programs are available;

map a set of pre-existing and generated programs to each action of the set of identified actions;

create a set of support programs comprising the mapping of the generated set of programs and the any pre-existing programs; and store the set of support programs in the database, wherein the database comprises an inventory of support programs.

* * * * *